United States Patent
Dermody, IV

(10) Patent No.: US 8,002,781 B1
(45) Date of Patent: Aug. 23, 2011

(54) BRAIDED SLEEVE WITH INTEGRAL FLANGED END AND ITS ASSOCIATED METHOD OF MANUFACTURE

(76) Inventor: William E. Dermody, IV, Sparta, NJ (US)

( * ) Notice: Subject to any disclaimer, the term of this patent is extended or adjusted under 35 U.S.C. 154(b) by 1492 days.

(21) Appl. No.: 11/401,215

(22) Filed: Apr. 11, 2006

(51) Int. Cl.
*A61B 17/08* (2006.01)
*A61F 2/06* (2006.01)

(52) U.S. Cl. ....... 606/151; 156/148; 174/72 A; 174/109; 606/191; 606/198; 606/108

(58) Field of Classification Search ............... 606/151, 606/153, 191, 198, 108; 156/148; 174/72 A, 174/109
See application file for complete search history.

(56) References Cited

U.S. PATENT DOCUMENTS

| | | | | |
|---|---|---|---|---|
| 4,983,240 A | * | 1/1991 | Orkin et al. | 156/148 |
| 5,186,992 A | | 2/1993 | Kite, III | 428/36.3 |
| 5,230,131 A | * | 7/1993 | Hobson, Jr. | 29/402.06 |
| 5,475,956 A | * | 12/1995 | Agrawal et al. | 52/208 |

FOREIGN PATENT DOCUMENTS

FR    2 830 482 A1    * 10/2002

OTHER PUBLICATIONS

Brief translation of above French publication FR 2 830 482 A1 (2 pages in English).*

* cited by examiner

*Primary Examiner* — Vy Q Bui
(74) *Attorney, Agent, or Firm* — La Morte & Associates P.C.

(57) ABSTRACT

A braided sleeve device having a tubular body that is symmetrically disposed around an imaginary longitudinal axis. The tubular body has a first end, a second end and a flange transition point that is located proximate the second end. The tubular body is comprised of interwoven strands that extend from the first end to the second end. The tubular body has a first diameter from the first end to the flange transition point. The tubular body also has a diameter that increases in size from the flange transition point to the second end, therein forming a flare. The flare causes the interwoven stands of the braided sleeve to be reoriented into a perpendicular with the longitudinal axis. A reinforcement ring is bonded to the braided sleeve proximate its second end. The reinforcement ring retains the flare in the configuration of the braided sleeve.

10 Claims, 4 Drawing Sheets

BRAIDED SLEEVE WITH INTEGRAL FLANGED END AND ITS ASSOCIATED METHOD OF MANUFACTURE

BACKGROUND OF THE INVENTION

1. Field of the Invention

In general, the present invention relates to braided sleeves and the manufacturing methods used to produce braided sleeves. More particularly, the present invention relates to termination configurations for the free ends of braided sleeves.

2. Prior Art Description

Braided sleeves are used throughout industry to protect the exterior of many types of flexible cables and tubes. Braided sleeves are essentially tubes of interwoven plastic or fiberglass strands. Accordingly, braided sleeves are highly flexible and can be readily placed around wiring cables, plastic tubing and other such elements.

Braided sleeves are used for many reasons. Most often, braided sleeves are used to protect soft wiring cables or tubing from contact wear. Braided sleeves also act as a physical barrier from dirt and other contaminants. Braided sleeves are also often used to provide heat insulation and/or to provide a more aesthetic facade to the exterior of an otherwise unattractive cable or tube.

Regardless of the purpose of the braided sleeve, the braided sleeve itself is manufactured by interweaving strands of various materials. The materials selected depend upon the intended use of the braided sleeve. Braided sleeves used for wear protection are made from highly durable polymers. Braided sleeves used for thermal protection are made from fibers that have high insulation values. Braided sleeves used for aesthetics can be made of plated wire or colorful plastic.

Braided sleeves are commercially manufactured in long lengths and rolled onto large spools. The braided sleeves are then selectively cut to length by an end user or by special order for an end user. Since braided sleeves are woven structures, they have a tendency to unravel at their edges. Accordingly, when a braided sleeve is cut to length, the cut end will begin to unravel over time. In many situations, the tendency for the braided sleeves to unravel and fray at its ends is ignored. However, many end users do not want the ends of a braided sleeve to fray at all. Accordingly, secondary manufacturing procedures are used to terminate the ends of a braided sleeve after the braided sleeve is cut to length.

Often the cut ends of a braided sleeve are subjected to high heat so that the newly cut strands melt and bond together. In U.S. Pat. No. 5,186,992, entitled Braided Product And Method Of Making Same, the braided sleeve is dipped in a flexible, curable polymer. As the polymer cures, it binds the strands of the braided sleeve. Consequently, when the braided sleeve is cut, the cut end does not unravel. Although such prior art termination techniques do prevent ends from fraying, such techniques often have unintended adverse effects. Braided sleeves, by the nature of their construction, increase in diameter as the braided sleeve is linearly compressed. This physical attribute is very useful when a braided sleeve is placed around a wire cable or tube. In applying a braided sleeve around a secondary object, the braided sleeve is cut to length and then compressed. The compressed braided sleeve becomes shorter and wider. It is therefore easier to pass the compressed braided sleeve around another object. Once in place, the braided sleeve is pulled to its normal length, wherein it returns to its normal diameter.

When a braided sleeve has its ends heat bonded or dipped, the bonding material prevents the braided sleeve from expanding when compressed. The braided sleeve therefore becomes more difficult to install. Furthermore, the dipping or coating of the braided sleeve covers the exterior of the braided sleeve. If the braided sleeve is made from visually pleasing materials, the dipped coating can detract from the aesthetics of the braided sleeve.

Another disadvantage of prior art braided sleeves is that the ends of the braided sleeve are often exposed. The exposed ends of a braided sleeve can be contacted by other surrounding objects. As the ends of a braided sleeve are contacted, they unravel all the faster.

A need therefore exists for an improved manner of terminating braided sleeves that prevents the ends of the braided sleeve from unraveling and also protects the ends of the braided sleeve from inadvertent contact. This need is met by the present invention as described and claimed below.

SUMMARY OF THE INVENTION

The present invention is a braided sleeve device having a tubular body that is symmetrically disposed around an imaginary longitudinal axis. The tubular body has a first end, a second end and a flange transition point that is located proximate the second end. The tubular body is comprised of interwoven strands that extend from the first end to the second end.

The tubular body has a first diameter from the first end to the flange transition point. The tubular body also has a diameter that increases in size from the flange transition point to the second end.

To make the braided sleeve, a segment of braided sleeve is cut to length. A flare is created in the braided sleeve proximate its second end. The flare causes the interwoven stands of the braided sleeve to be reoriented into a perpendicular with the longitudinal axis. A reinforcement ring is bonded to the braided sleeve proximate its second end. The reinforcement ring retains the flare in the configuration of the braided sleeve.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
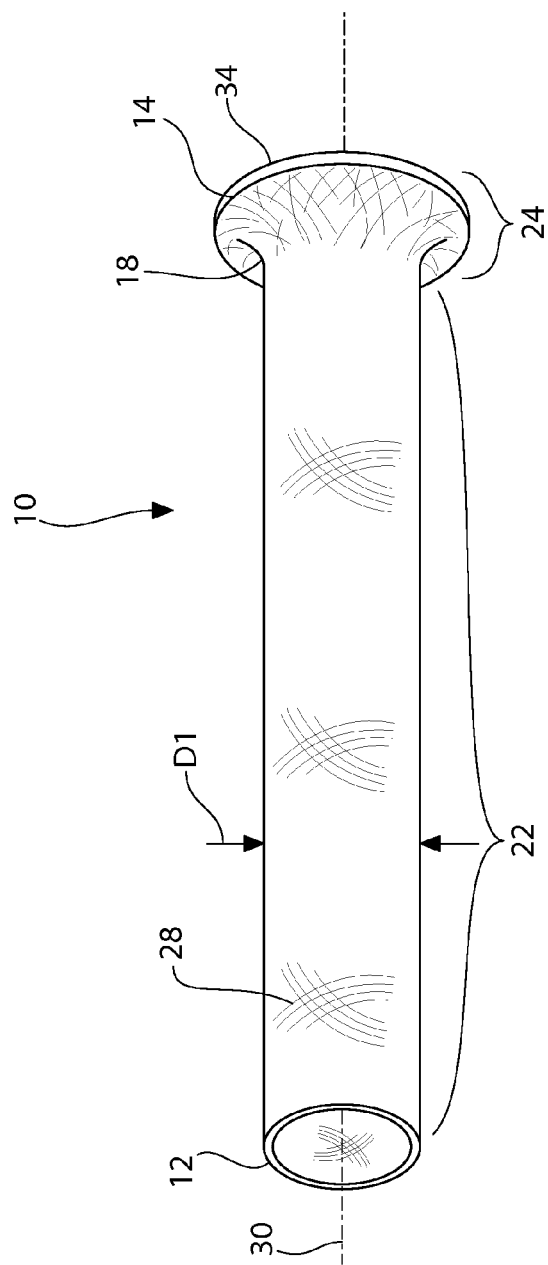
FIG. 1 is a side view of an exemplary embodiment of a braided sleeve in accordance with the present invention.
Figure 2:
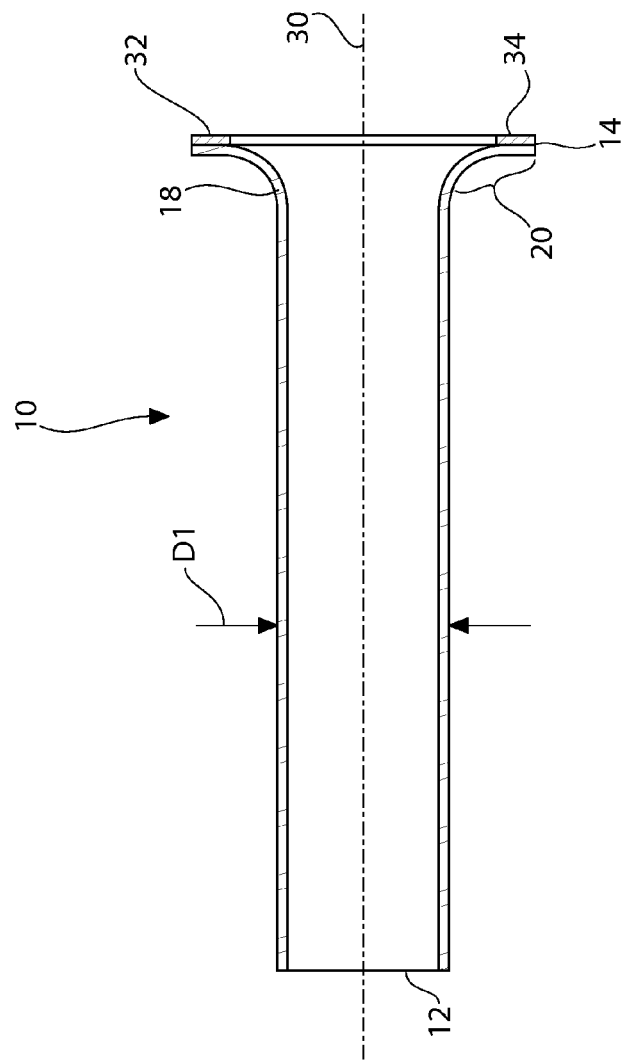
FIG. 2 is a cross-sectional view of the embodiment of FIG. 1.

Referring to FIG. 1 and FIG. 2, there is shown an exemplary embodiment of a braided sleeve 10 in accordance with the present invention. The braided sleeve 10 has a first end 12 and an opposite second end 14. The length of the braided sleeve 10 is irrelevant and depends upon the intended use of the braided sleeve 10. Thus, the braided sleeve 10 can have a length as short as a few inches or as long as a few feet.

The braided sleeve 10 is flared near the second end 14, thereby creating a mounting flange structure 20 at the second end 14. The mounting flange structure 20 begins at a flange transition point 18 along the length of the braided sleeve 10. Due to the changing structure of the braided sleeve 10, the braided sleeve 10 has two sections. The first section is the uniform diameter section 22. The uniform diameter section 22 runs from the first end 12 of the braided sleeve 10 to the flange transition point 18. In the uniform diameter section 22, the braided sleeve 10 forms a tube having a uniform diameter D1. The diameter D1 of the uniform diameter section 22 is a matter of design choice and is selected depending upon the object the braided sleeve 10 is intended to cover. If the braided sleeve 10 is being used to cover a wire cable or a fuel line, the diameter of the braided sleeve 10 may be less than one inch. However, if a multi-wire cable is being covered, the diameter D1 of the uniform diameter section 22 may be a few inches across.

The second section of the braided sleeve 10 is the flared section 24. The flared section 24 encompasses the mounting flange structure 20. The flared section 24 begins at the flange transition point 18 and continues to the second end 14 of the braided sleeve 10. In the flared section 24, the diameter of the braided sleeve 10 increases. The diameter of the braided sleeve 10 at the flange transition point 18 is the same as the diameter D1 of the uniform diameter section 22. However, the diameter of the braided sleeve 10 at the second end 14 is at least fifty percent (50%) larger than that of the uniform diameter section 22.

The braided sleeve 10 is tubular in shape, being symmetrically formed around an imaginary longitudinal axis 30 that runs the length of the braided sleeve 10. The braided sleeve 10 is fabricated from a plurality of mono-filament or multi-filament strands 28 that are interwoven or "braided" to form the braided sleeve 10. There exist several weave patterns for strands that are used to form braided sleeves. Many of these weave patterns can be used in the fabrication of the present invention braided sleeve 10.

Each of the strands 28 used in the fabrication of the braided sleeve 10 remains a uniform distance from the longitudinal axis 30 in the uniform diameter section 22 of the braided sleeve 10. In the uniform diameter section 22 of the braided sleeve 10, the strands 28 either run parallel to the longitudinal axis 30 or orbit the longitudinal axis 30 in a helical pattern. However, once the strands 28 enter the flared section 24 of the braided sleeve 10, the strands 28 travel away from the longitudinal axis 30 of the braided sleeve 10, terminating in an orientation at the second end 14 that is generally perpendicular to the longitudinal axis 30.

The mounting flange structure 20 causes the second end 14 of the braided sleeve 10 to have a flat face surface 32 that lay in a plane perpendicular to the longitudinal axis 30 of the braided sleeve 10. A reinforcement ring 34 is applied to the flat face surface 32 of the mounting flange structure 20. The reinforcement ring 34 is either a ring of thermoset adhesive or a piece of material that is coated in thermoset adhesive. In the shown embodiment, the reinforcement ring 34 is uniformly made of a thermoset adhesive. The flat face surface 32 of the mounting flange structure 20 is heat bonded to the reinforcement ring 34 of thermoset adhesive. The reinforcement ring 34 of thermoset adhesive serves two proposes. First, the reinforcement ring 34 of thermoset adhesive bonds the strands 28 of the braided sleeve 10 together along the flat face surface 32 of the mounting flange structure 20. This prevents the strands 28 from unraveling. However, since the reinforcement ring 34 only engages the flat face surface 32 of the mounting flange structure 20, the presence of the reinforcement ring 34 has little effect on the ability of the braided sleeve 10 to expand along its entire length.

The second advantage of the reinforcement ring 34 is that it provides adhesive to the flat face surface 32 of the mounting flange structure 20. Accordingly, the flat face surface 32 can be bonded to any flat surface. It will therefore be understood that if a braided sleeve 10 were used to protect a cable extending out of a flat wall, the mounting flange structure 20 can be adhesively attached directly to the wall around the cable. The adhesive attachment prevents the second end 14 of the braided sleeve 10 from becoming contacted and frayed.

Figure 3:
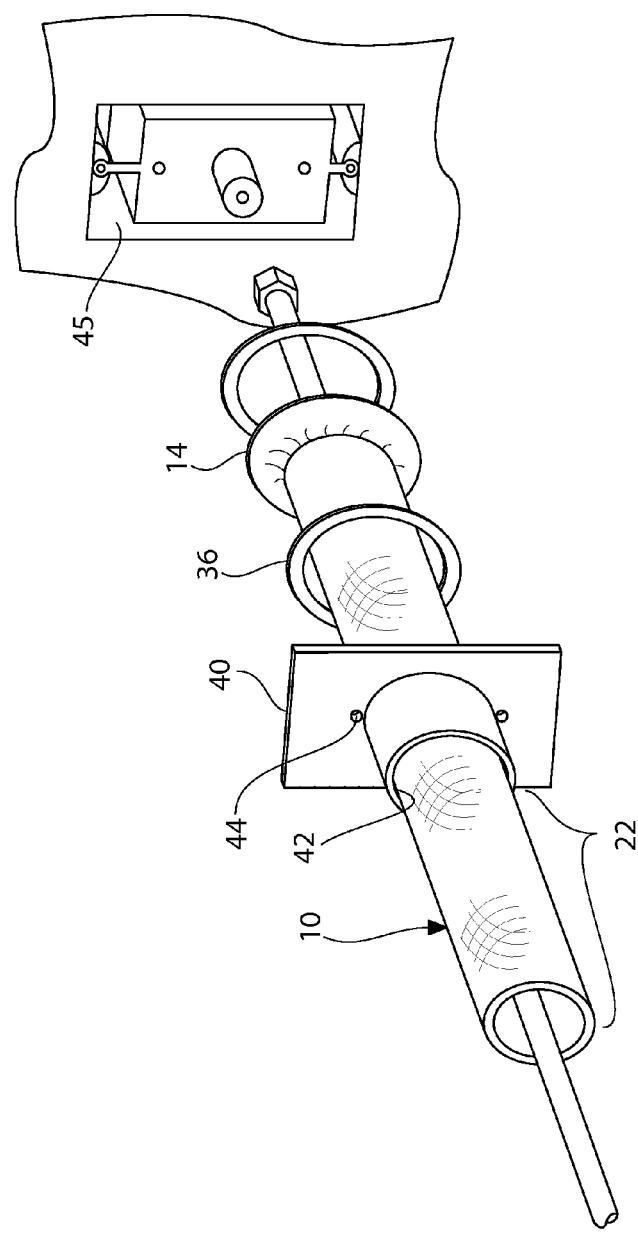
FIG. 3 is a perspective view of an alternate embodiment of the present invention shown in conjunction with a junction box.

Referring to FIG. 3, an alternate embodiment of the present invention braided sleeve system is shown. In the embodiment of FIG. 3, a braided sleeve 10 is shown that has a configuration nearly identical to that shown in FIG. 1 and FIG. 2. Accordingly, the same reference numbers will be used to reference the same parts, in order to avoid confusion. The braided sleeve 10, however, differs from the earlier braided sleeve only in that a second reinforcement ring 36 of thermoset adhesive is applied to the back of the mounting flange structure 20.

A faceplate 40 is provided. The faceplate defines an opening 42 that is slightly larger than the uniform diameter section 22 of the braided sleeve 10. The uniform diameter section 22 of the braided sleeve 10 passes through the opening 42 in the faceplate 40. The mounting flange structure 20 adhesively bonds to the surface of the faceplate 40 that is contacted by the second reinforcement ring 36 of thermoset adhesive. Accordingly, the braided sleeve 10 and the faceplate 40 become adhesively bonded together.

The faceplate 40 is the faceplate to a junction box 45. The faceplate 40 has screw holes 44 for mounting screws that can join the faceplate 40 to a junction box 45. Accordingly, by attaching the braided sleeve 10 to a faceplate 40 and attaching a faceplate 40 to a junction box 45, the braided sleeve 10 can be used to protect many types of wires and cables that may extend from a junction box 45. The second end 14 of the braided sleeve 10 is adhesively attached to the faceplate 40 and mechanically connected to the junction box 45. As a consequence, the second end 14 of the braided sleeve 10 is protected and the braided sleeve 10 cannot be pulled out of the wall.

Figure 4:
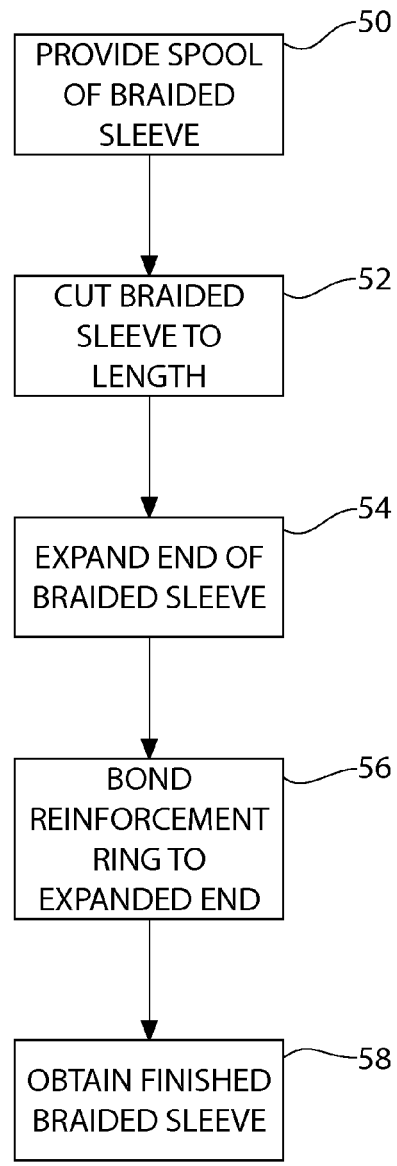
FIG. 4 is a block diagram schematic illustrating an exemplary method of manufacture.

Referring to FIG. 4, an exemplary method of fabrication for the braided sleeve can be described. First, a spool of braided sleeve is provided that has been manufactured in a traditional manner. See Block 50. The braided sleeve on the spool is then cut into desired lengths. See Block 52. Once the proper length of braided sleeve is obtained, the second end of the braided sleeve is placed into a jig with either one or two reinforcement rings of thermoset adhesive. See Block 54. The jig is used to expand the second end of the braided sleeve into the mounting flange structure. Once expanded into the mounting flange structure, heat is applied to bond the reinforcement rings to the mounting flange structure. See Block 56. Once the thermoset adhesive cools, it sets the strands of the mounting flange structure in place, thereby preserving the shape. The end result is a braided sleeve having one end that is flared into mounting flange structure. See Block 58.

It will be understood that the embodiments of the present invention that have been described and illustrated are only exemplary and that a person skilled in the art can make many variations to those embodiments. For example, in the shown embodiments, the braided sleeve has a mounting flange structure only at one end. It will be understood that braided sleeves can be made having mounting flange structures at both ends. Furthermore, the illustrated embodiment shows a braided sleeve that has a continuous peripheral wall. It will be understood that braided sleeves with reclosable seams can also be used. All such variations, modifications and alternate embodiments are intended to be included within the scope of the present invention as set forth in the claims.

What is claimed is:

1. A braided sleeve device, comprising:

a tubular body symmetrically disposed around an imaginary longitudinal axis, said tubular body having a first end, a second end and a flange transition point disposed proximate said second end, wherein said tubular body is comprised of interwoven strands that extend from said first end to said second end, wherein said tubular body has a first diameter from said first end to said flange transition point and a diameter that increases in size from said flange transition point to said second end to form a mounting flange structure, said mounting flange structure having a front surface where said interwoven strands are oriented at a perpendicular to said longitudinal axis;

a ring of thermoset adhesive heat bonded to said front surface, wherein said ring of thermoset adhesive bonds said interwoven strands together and prevents said interwoven strands from unraveling from said mounting flange structure.

2. The device according to claim 1, wherein said mounting flange structure has a rear surface.

3. The device according to claim 2, further including a reinforcement ring attached to said mounting flange structure.

4. The device according to claim 2, further including a second ring of thermoset adhesive bonded to said rear surface.

5. The device according to claim 1, further including a faceplate that defines a hole, wherein said tubular body extends through said hole and said faceplate is bonded to said mounting flange structure with said ring of thermoset adhesive.

6. The device according to claim 1, wherein said second end of said tubular body has a second diameter that is at least fifty percent larger than said first diameter.

7. A braided sleeve device, comprising:

a tubular body comprised of interwoven strands, said tubular body having a first end, an opposite second end and a longitudinal axis, wherein said strands flare away from said longitudinal axis proximate said second end and terminate in a flared orientation perpendicular to said longitudinal axis at said second end; and a ring of thermoset adhesive heat bonded to said flared orientation, therein binding said strands together and preventing said strands from unraveling.

8. The device according to claim 7, wherein said strands begin to flare away from said longitudinal axis at a flare transition point between said first end and said second end.

9. The device according to claim 8, wherein said tubular body has a constant diameter between said first end and said flare transition point.

10. The device according to claim 8, wherein said second end has a diameter at least fifty percent larger than said first end.

* * * * *